C. C. RUSSELL.
SCREW PLATE.
APPLICATION FILED JUNE 21, 1912.
1,061,129.
Patented May 6, 1913.
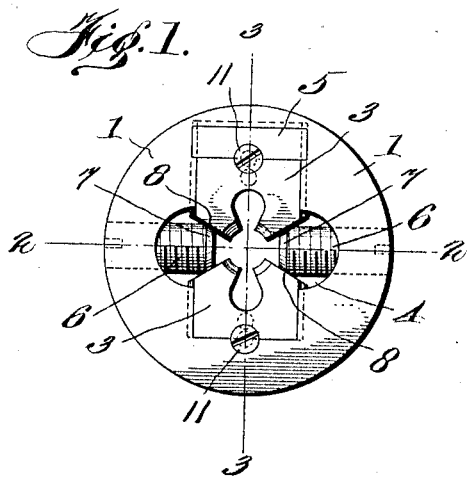
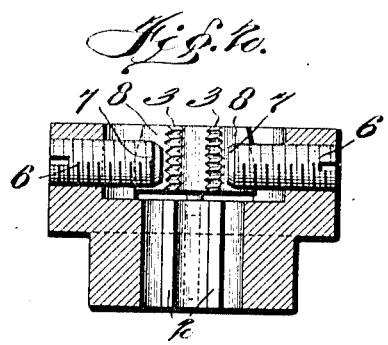
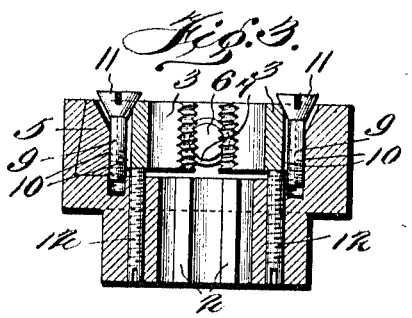

UNITED STATES PATENT OFFICE.

CHARLES C. RUSSELL, OF GREENFIELD, MASSACHUSETTS.

SCREW-PLATE.

1,061,129. Specification of Letters Patent. Patented May 6, 1913.

Application filed June 21, 1912. Serial No. 705,148.

*To all whom it may concern:*

Be it known that I, CHARLES C. RUSSELL, a citizen of the United States, residing at Greenfield, in the county of Franklin and State of Massachusetts, have invented certain new and useful Improvements in Screw-Plates; and I do hereby declare the following to be a full, clear, and exact description of the invention, such as will enable others skilled in the art to which it appertains to make and use the same.

My invention relates to improvements in screw plates, and it consists in the constructions, combinations and arrangements here-in described and claimed.

An object of my invention is to provide an improved screw plate, in which the die members can be accurately adjusted and firmly locked in position by the use of a screw driver, without the employment of special wrenches or tools.

A further object of my invention is to provide an improved screw plate having means for adjusting and holding screw-cutting die members to gage, and for positively insuring the maintenance of said adjustable die members equidistant from the center of the collet.

In the accompanying drawings forming a part of this application, and in which similar reference symbols indicate corresponding parts in the several views:—Figure 1 is a face view, illustrating one embodiment of my invention; Fig. 2 is a section on the line 2—2 of Fig. 1; Fig. 3 is a section on the line 3—3 of Fig. 1.

Referring to the drawings, 1 indicates a collet provided with integral guides 2 for starting bolts true, and having undercut recesses extending from its face for receiving adjustable die members 3; said die members being readily removed and inserted through an enlarged recess 4 intermediate of said undercut recesses, and being forced snugly into place against the undercut walls of such recess by means of screws 12, which may engage the lower face of said die members or of liner plates positioned therebeneath. As shown in Figs. 1 and 3, a block 5 is removably fitted in one of the undercut recesses for permitting convenient insertion and removal of the die members 3, but it is obvious that said block could be dispensed with by shortening the length of said die members, or by making the tapered screw head 11 sufficiently large to provide a space behind said die members.

A pair of coaxial screws 6 are threaded through the collet 1, and provided with tapered, or conical, ends 7 adapted to engage correspondingly tapered faces 8 on the adjacent walls of the adjustable die members 3, for accurately spacing said members to gage and insuring the maintenance of said members equidistant from the center of the collet. It will be evident that the same result could be efficiently obtained by employing only one of the screws 6, if desired.

Locking, or adjusting, screws 9 are threaded in the collet and extend through recesses 10 in the adjacent walls of the collet and die members; said screws being provided with tapered heads 11 adapted to seat within the flaring, or tapered, upper ends of such recesses for wedging the die members against said gage screws 6. Where the removal block 5 is employed, said block constitutes, in effect, a part of the collet when in position.

I have illustrated and described preferred and satisfactory constructions, but changes could be made within the spirit and scope of my invention.

I claim:—

1. The combination of a collet provided with an integral guide on its front face and with undercut recesses extending from its rear face, adjustable die members removably mounted in such recesses, and adjustable means accessible at the front face of said collet for maintaining said die members in snug engagement with the undercut walls of such recesses.

2. The combination of a collet provided with an integral guide on its front face and with undercut recesses extending from its rear face, adjustable die members removably mounted in such recesses, adjustable means accessible at the front face of said collet for maintaining said die members in snug engagement with the undercut walls of such recesses, a common means engaging said die members for spacing the latter to
5 gage, and tapered means between said collet and die members for wedging the latter against said spacing means.

In testimony whereof, I affix my signature, in presence of two witnesses.

CHARLES C. RUSSELL.

Witnesses:
MARION E. HANDFORTH,
JOHN D. BOUKER.

Copies of this patent may be obtained for five cents each, by addressing the "Commissioner of Patents, Washington, D. C."